J. B. HOAGLAND.
NUT LOCK.
APPLICATION FILED MAY 9, 1908.
908,670.
Patented Jan. 5, 1909.
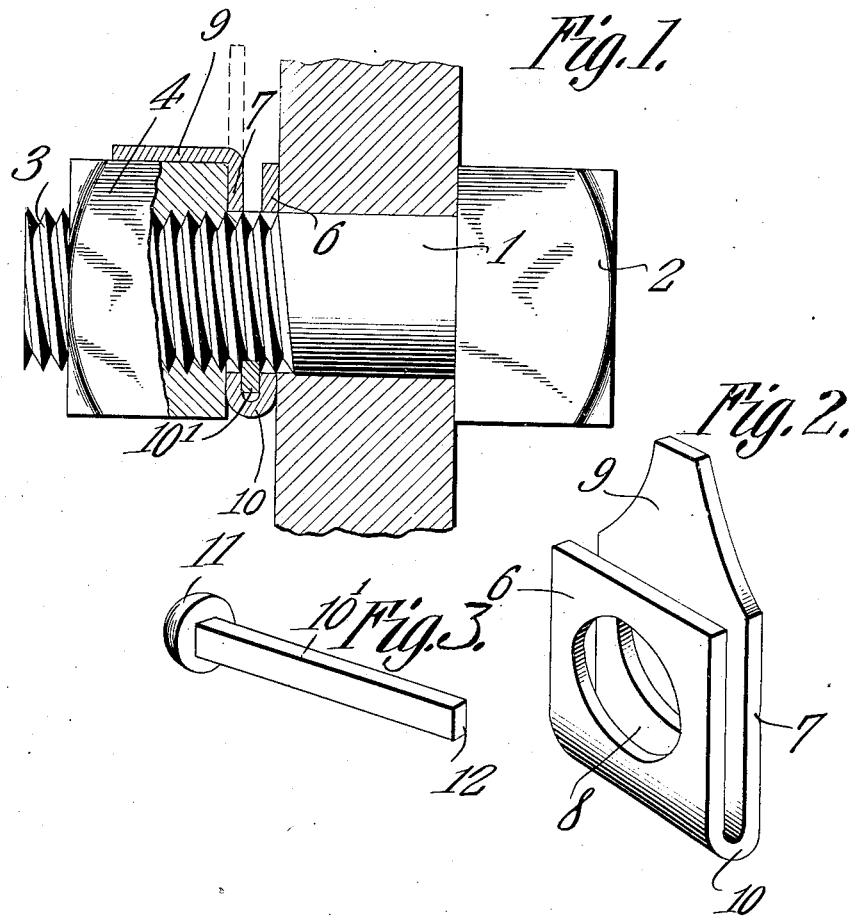
Witnesses
Inventor
John B. Hoagland.
By C. A. Snow & Co
Attorneys

UNITED STATES PATENT OFFICE.

JOHN B. HOAGLAND, OF ST. LOUIS, MISSOURI.

NUT-LOCK.

No. 908,670.          Specification of Letters Patent.          Patented Jan. 5, 1909.

Application filed May 9, 1908. Serial No. 431,953.

*To all whom it may concern:*

Be it known that I, JOHN B. HOAGLAND, a citizen of the United States, residing at St. Louis, in the county of St. Louis City and State of Missouri, have invented a new and useful Nut-Lock, of which the following is a specification.

This invention relates to nut locks and has for its object to provide a simple and convenient device for securely holding a nut on a bolt against loosening by vibration or from other causes.

Another object is to provide a key which will automatically form a seat in the thread of the bolt during the operation of inserting said key in position.

With these and other objects in view as will more fully hereinafter appear, the present invention consists in certain novel details of structure and arrangement of parts hereinafter fully described illustrated in the accompanying drawings and more particularly pointed out in the appended claim it being understood that various changes in the form proportion, size and minor details of the device may be made without departing from the spirit or sacrificing any of the advantages of the invention.

In the accompanying drawings, Figure 1 is an elevation partly in section showing a locking device constructed in accordance with the invention. Fig. 2 is a perspective view of the locking plate used in Fig. 1. Fig. 3 is a perspective view of the locking key.

In the construction of the device illustrated in Figs. 1 and 2 an ordinary bolt 1 is provided with the usual head 2 and threaded shank 3. On the threaded shank is adapted to be run a common form of nut 4, a locking plate preferably formed of a rectangular metallic plate is doubled upon itself forming the opposed legs 6 and 7. The leg 7 is provided with a lug 9 extending beyond the end of the leg 6, the function of which will presently appear. Through the legs 6 and 7 and adjacent the bending point 10 are formed registering openings 8 of a diameter sufficient to slidingly fit over the threaded shank 3 of the bolt. A key pin preferably formed of a metallic bar and provided at one end with an enlarged head 11, the shank 10' of the pin is slightly tapered and terminates in a square end 12. In assembling the parts as shown in Fig. 1 the bolt is first inserted through the device which it is intended to hold and the locking plate placed in position on the threaded shank 3. The nut 4 is then run onto the shank 3 until its inner end abuts the outer leg 7 of the locking plate, the lug 9 on this leg of the locking plate is now bent over one of the faces of the nut and the key pin driven between the bending point 10 and the threads 3. It is designed to have the opening between the threads 3 and bending point 10 of slightly less width than the width of the shank 10' of the key pin so that when the latter is driven home the square end 12 will remove portion of the thread 3 thus forming a seat which will serve to prevent the pin working loose by vibration or from other causes.

From the foregoing it is obvious that the locking device may be applied to most any form of nut and bolt now in use, and that the same can be readily unlocked when desired. The parts are simple in construction and comparatively inexpensive in manufacture, and may be used over and over again either in connection with the same or a new lock and bolt.

What is claimed is:—

In a nut lock the combination of a bolt and nut, a locking plate bent upon itself so as to form legs, said legs provided with alining openings to fit over the shank of said bolt, one of said legs terminating in a lug to engage the faces of said nut, and a key pin adapted to be driven between the opposed legs of said locking plate and remove a portion of the thread of said bolt.

In testimony that I claim the foregoing as my own, I have hereto affixed my signature in the presence of two witnesses.

JOHN B. HOAGLAND.

Witnesses:
     JOHN C. ABLETT,
     WENDLIN ZOLK.